United States Patent
Schneider et al.

[11] Patent Number: 5,901,979
[45] Date of Patent: May 11, 1999

[54] AIRBAG CUSHION AND MOUNTING THEREFOR

[75] Inventors: David W. Schneider, Waterford; Patrick G. Jarboe, Almont Township; Daniel J. Snyder, Sterling Heights, all of Mich.

[73] Assignee: Autoliv ASP, Inc., Ogden, Utah

[21] Appl. No.: 08/851,681

[22] Filed: May 6, 1997

[51] Int. Cl.[6] .................................................. B60R 21/30
[52] U.S. Cl. ...................................... 280/738; 280/743.1
[58] Field of Search ............................... 280/743.1, 738, 280/743.2, 729

[56] References Cited

U.S. PATENT DOCUMENTS

| | | | |
|---|---|---|---|
| 3,762,741 | 10/1973 | Fleck et al. | 280/729 |
| 3,843,150 | 10/1974 | Harada et al. | 280/729 |
| 3,929,350 | 12/1975 | Pech | 280/738 |
| 3,994,506 | 11/1976 | Weman | 280/738 |
| 4,076,277 | 2/1978 | Kuwakado et al. | 280/738 |
| 5,207,450 | 5/1993 | Pack et al. | 280/738 |
| 5,338,061 | 8/1994 | Nelson et al. | 280/738 |
| 5,542,695 | 8/1996 | Hanson | 280/729 |

*Primary Examiner*—Paul N. Dickson
*Attorney, Agent, or Firm*—George W. Rauchfuss, Jr.

[57] ABSTRACT

An airbag cushion has a deployment tube connected at its inner end to a backing plate securing an inflator and at its outer end to a cushion-shaping enclosure. The periphery of the cushion-shaping enclosure is attached there about to a boundary wall which extends inward to the backing plate at a location surrounding the inner end of the deployment tube. The boundary wall defines an aspirated-air chamber surrounding the tube. As the tube and cushion-shaping enclosure are inflated, the enclosure pulls the boundary wall out of the canister creating a vacuum in the aspirated-air chamber. A one-way valve in the backing plate passes aspirated air into the aspirated-air chamber. A port connects the cushion-shaping enclosure to the aspirated-air chamber to pressurize the aspirated-air chamber at the end of inflation. The one-way valve blocks escape of the pressure.

19 Claims, 5 Drawing Sheets

AIRBAG CUSHION AND MOUNTING THEREFOR

FIELD OF THE INVENTION

This invention relates to an airbag cushion and mounting therefor. More specifically this invention relates to an airbag cushion and mounting therefor structured so that a portion of the inflation can be accomplished by aspirated air.

BACKGROUND OF THE INVENTION

In the past, vehicle passenger safety restraint airbag cushions have generally been inflated totally by an inflator mounted in the vehicle structure and connected with the inner end of the airbag cushion Airbag cushions have been generally single-chamber structures wherein the inflator discharges directly into the cushion to inflate it. This has required a high volume discharge of the inflator and has necessitated inflators of a size and capacity which has been heretofore regarded as necessary. The inflation action has been aggressive and has required stout hardware.

Because space within a vehicle is ever at a premium and because reducing the size of the inflators would reduce expense and reduce space requirements and reduce the strength specifications of hardware, there has been a need for a cushion structure operable with a less powerful inflator.

SUMMARY OF THE INVENTION

Briefly, the invention is an airbag cushion having a deployment tube, the inner end of which is secured in the airbag backing plate. The outer end is connected to a cushion-shaping enclosure The periphery of the cushion-shaping enclosure is attached to a surrounding boundary wall which extends inward to the backing plate. The boundary wall and the inner panel of the cushion-shaping enclosure define an aspirated-air chamber surrounding the deployment tube. As the deployment tube and cushion-shaping enclosure fill and take form during inflation from inflation gas from an inflator, the cushion-shaping enclosure pulls the boundary wall out and away from the backing plate. A one-way valve on the backing plate lets ambient air be aspired into the aspirated-air chamber. A vent connects the cushion-shaping enclosure and the aspirated-air chamber for pressurizing the aspirated-air chamber with inflation gasses after the tube deployment and cushion-shaping enclosure are pressurized. The one-way valve blocks escape of the pressure.

BRIEF DESCRIPTION OF THE DRAWINGS

Further objects and features of the invention will be clear to those skilled in the art from a review of the following specification and drawings all of which present a non-limiting form of the invention. In the drawings

DESCRIPTION OF THE PREFERRED EMBODIMENT

Figure 1:
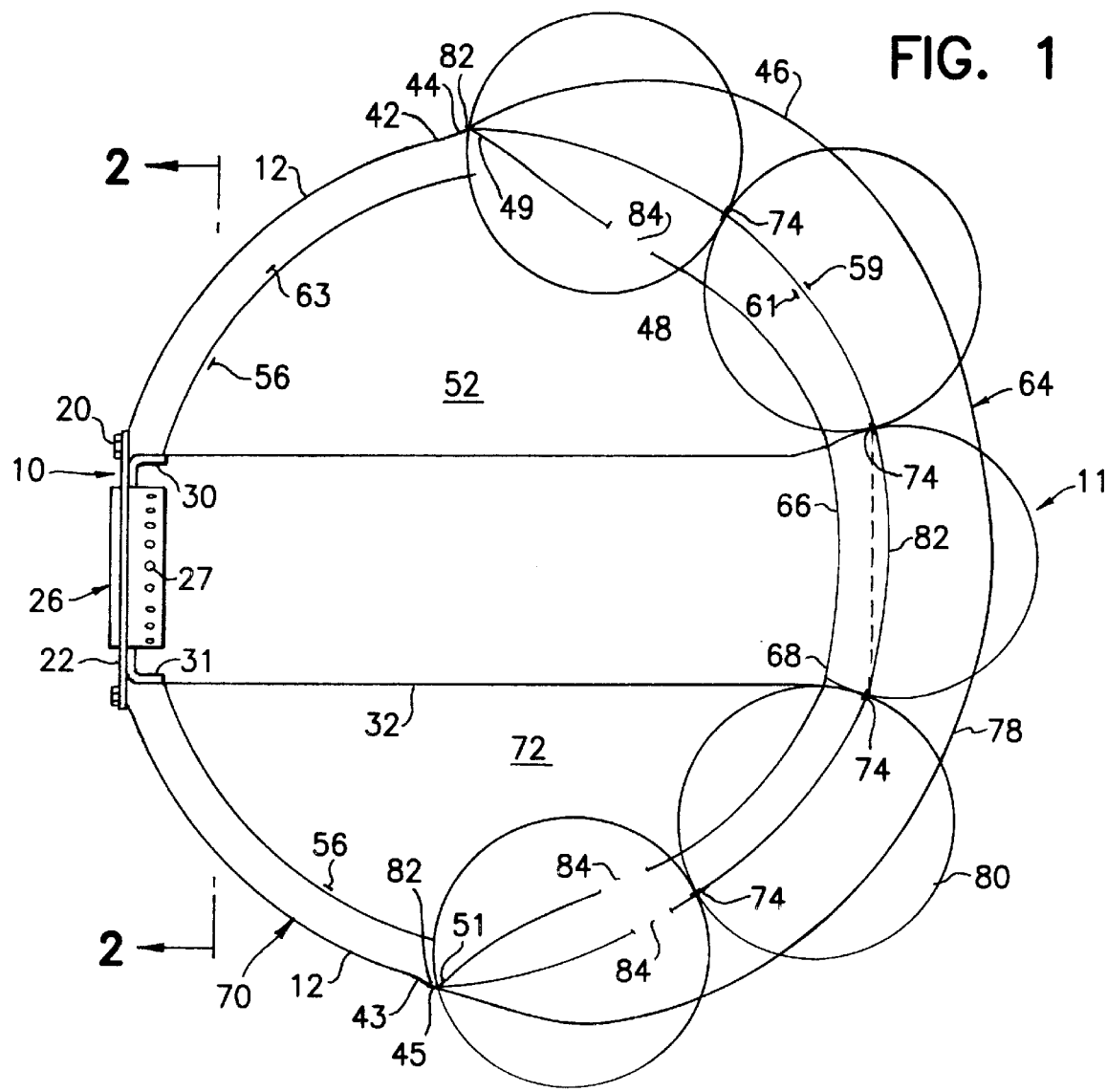
FIG. 1 is a sectional view taken on the line 1—1 of FIG. 3.

A preferred inflated airbag cushion and mounting embodying the invention is shown in section in FIG. 1. It comprises a mounting generally indicated as 10 and cushion 11.

Figure 4:
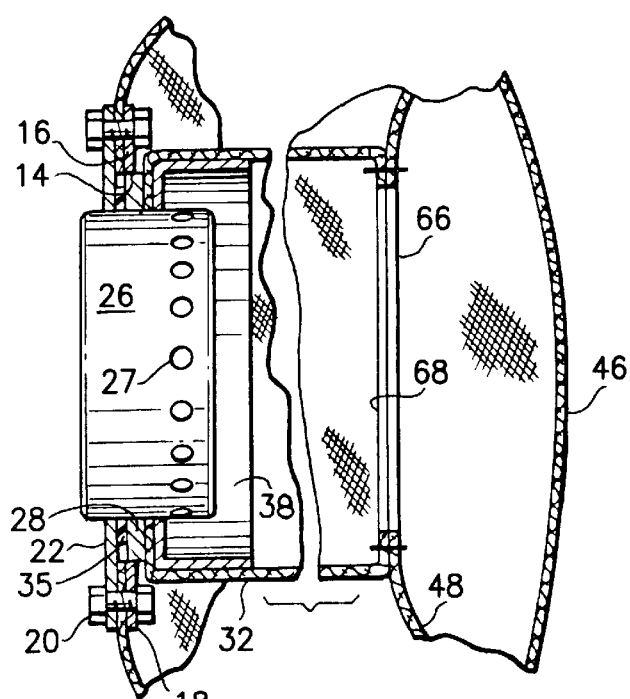
FIG. 4 is an enlarged broken fragmentary sectional view taken on the line 4—4 of FIG. 2 and showing the connection between the deployment tube and the backing plate and also showing the deployment tube and its connection to the cushion-shaping enclosure.
Figure 5:
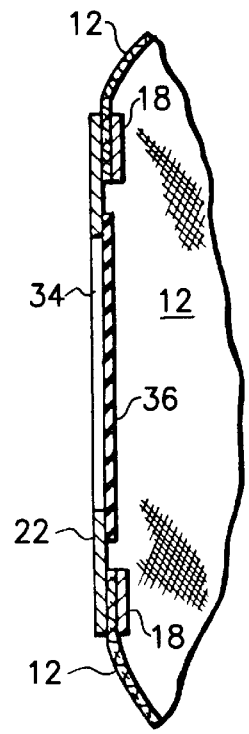
FIG. 5 is an enlarged fragmentary sectional view taken on the line 5—5 of FIG. 2.

Cushion 11 comprises a first fabric panel portion 12 formed with a rectangular opening 14 (FIGS. 1, 4). The margin 16 of the opening 14 is clamped by a frame 18 held by bolts 20 to a backing plate 22 comprising the mounting 10. The backing plate 22 is secured to the vehicle structure (not shown) Centrally the backing plate 22 is formed with an inflator opening 24 and in this inflator opening is secured an airbag inflator 26 having gas exhaust ports 27 (FIG. 6).

The inflator 26 has a radially outwardly extending flange 28. A retaining ring 30 is mounted on backing plate 22 and serves also as an anchor for the inner end of a fabric deployment tube 32. The fabric deployment tube 32, being part of the cushion 11, has its inner end tucked inwardly between retaining ring 30 and the backing plate 22.

Figure 2:
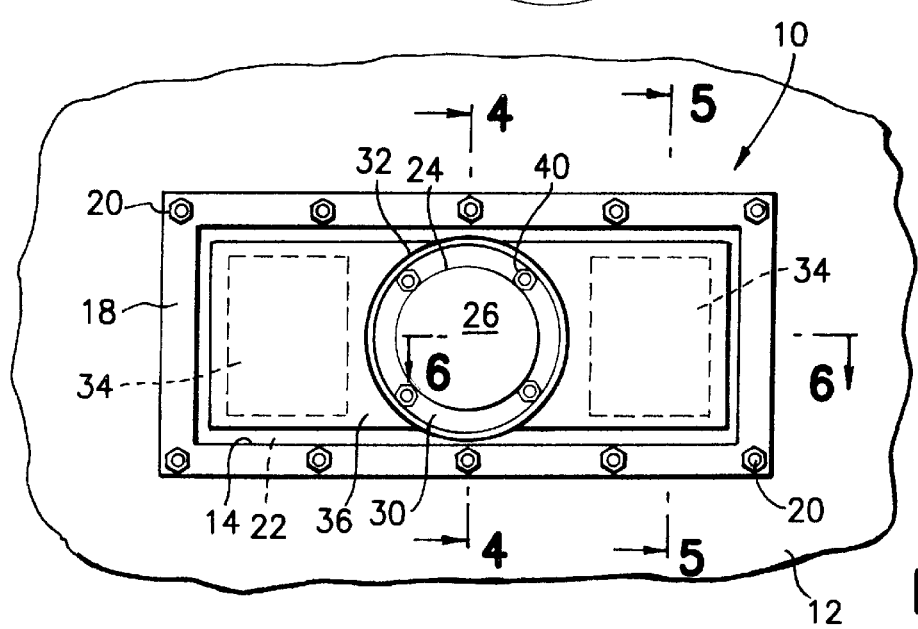
FIG. 2 is a fragmentary plan view taken on the line 2—2 of FIG. 1.
Figure 6:
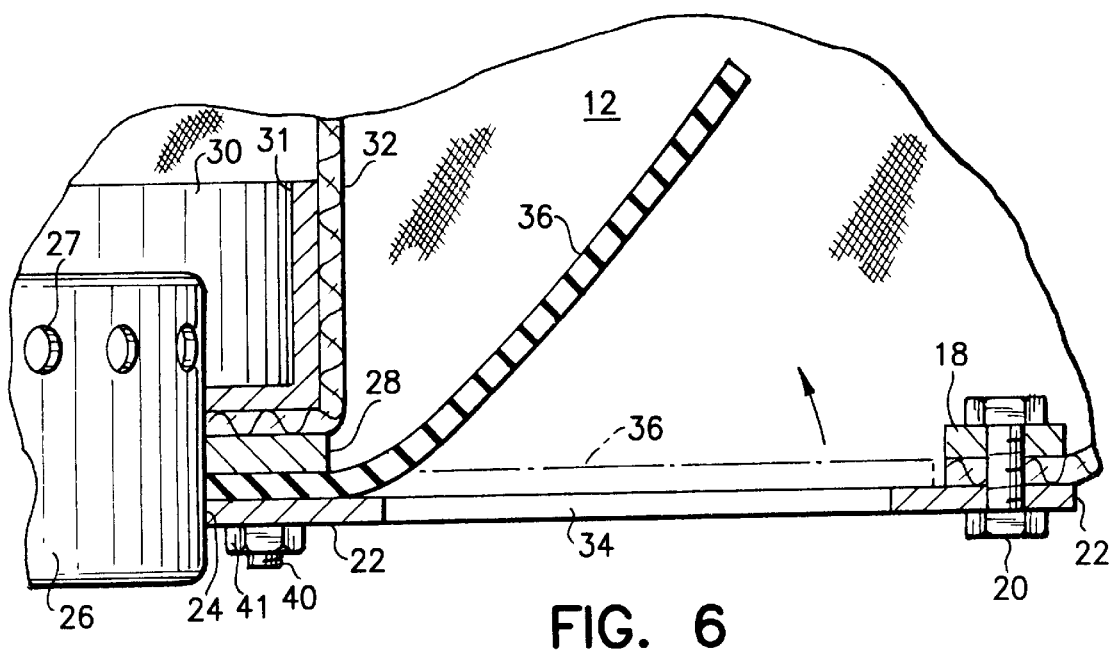
FIG. 6 is an enlarged fragmentary sectional view taken on the line 6—6 of FIG. 2 and showing one of the one-way check valves flexed to permit aspirated ambient air to passe as during an early stage in the inflation process.
Figure 7:
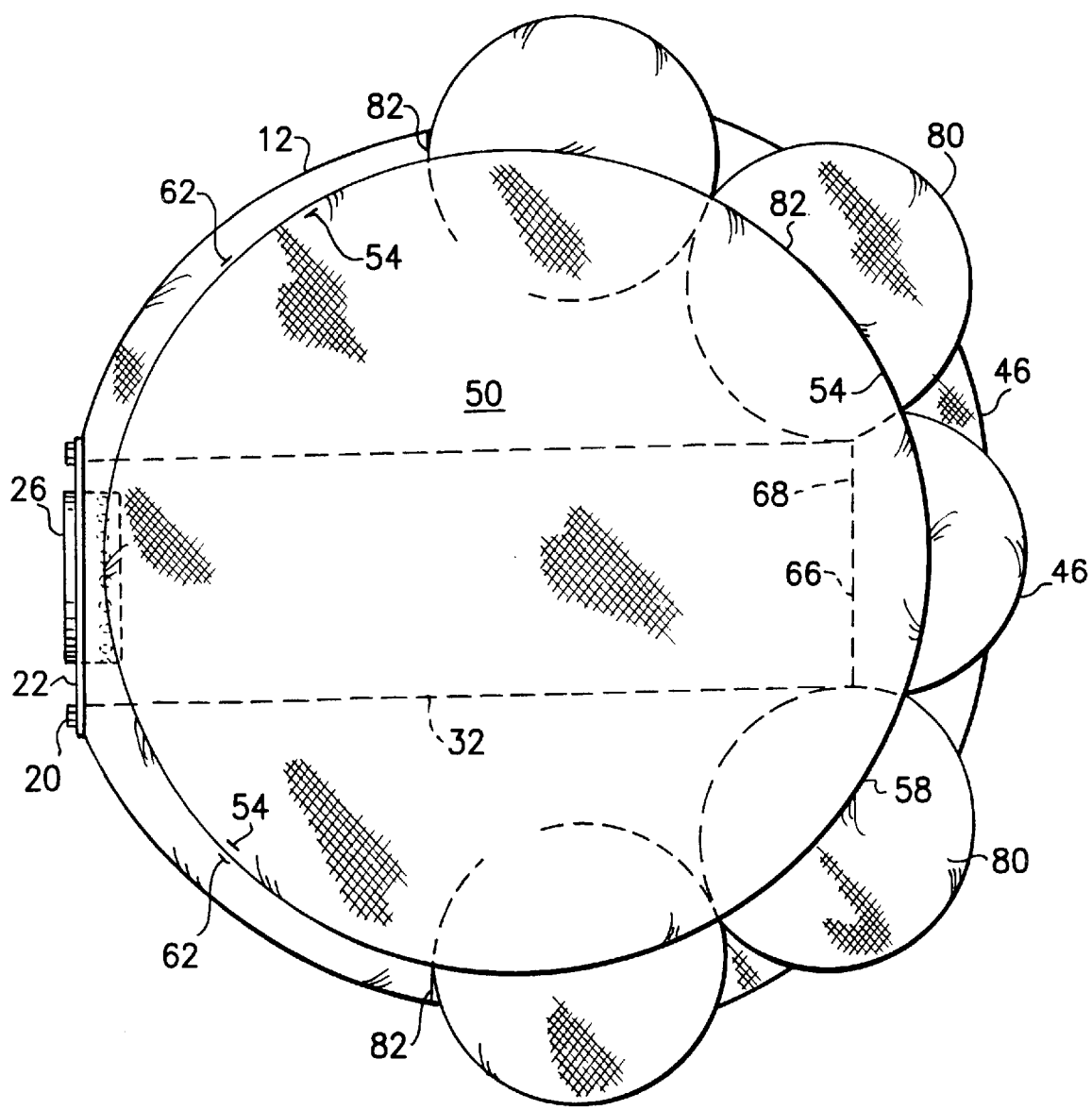
FIG. 7 is a left side elevational view of the cushion in its inflated condition.

The backing plate 22 is formed, on opposite sides of the deployment tube 32, with generally rectangular openings 34 (FIGS. 2 and 6). A one-piece resilient sheet 35 covering the two openings 34 constitutes two flapper valves 36, and the sheet has a central opening 38 which also receives the inflator 26. The retaining ring 30 has bolts 40 extending through the fabric of the deployment tube 32, through the resilient sheet 35, through the flange 28 on the inflator 26 and through the backing plate 22 where the bolts are nutted with nuts 41 to hold all these parts clamped together.

The flapper valve 36 extends outwardly on opposite sides of the inflator. The flapper valve 36 is preferably a sheet of resilient material, for instance, a thermoplastic polyester alloy or other material which exhibits little or no permanent deformation after deployment. It, thus, normally lies flat against the backing plate 22 closing the openings 34, but will permit aspirated passage of ambient air by flexing away from backing plate 22 as shown in FIG. 6 during the aspirating part of the inflation process.

Figure 3:
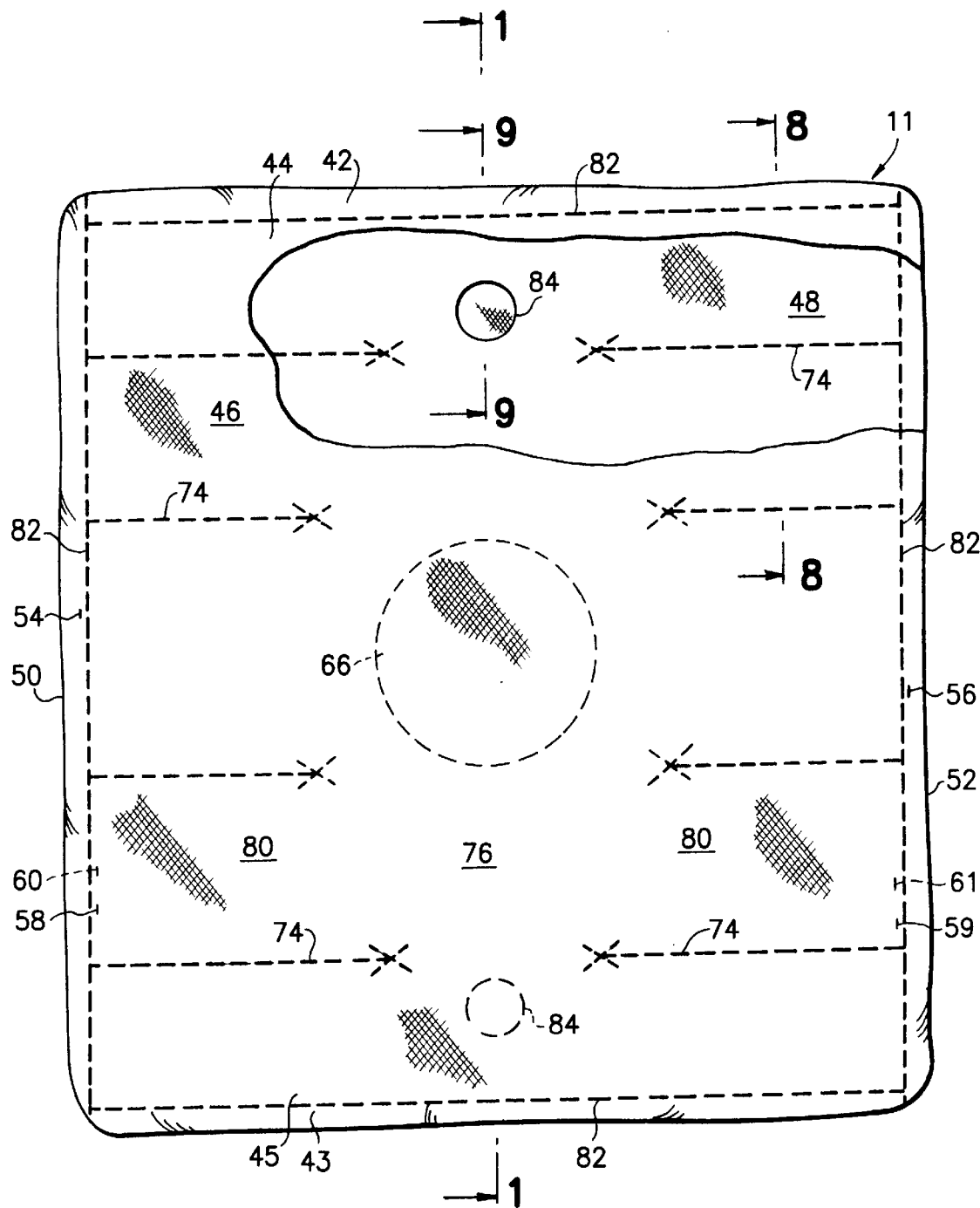
FIG. 3 is a front elevational view of an inflated cushion embodying the invention with part of the main panel broken away to reveal the port means.
Figure 8:
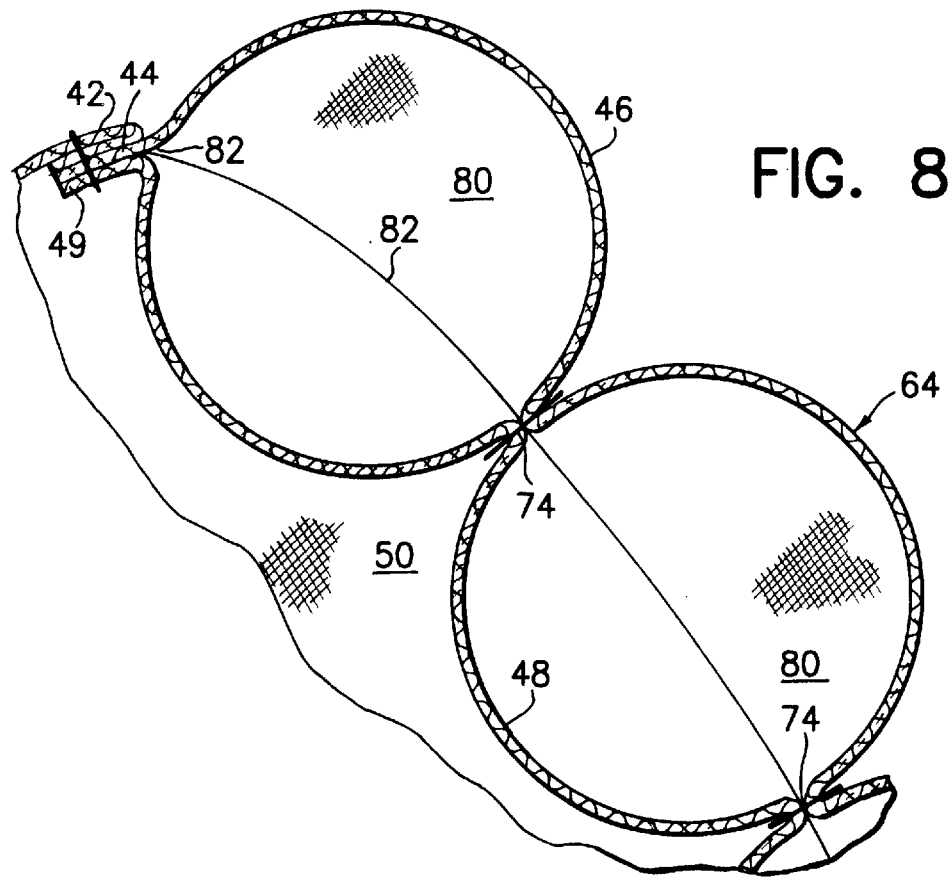
FIG. 8 is an enlarged fragmentary sectional view taken on the line 8—8 of FIG. 3.
Figure 9:
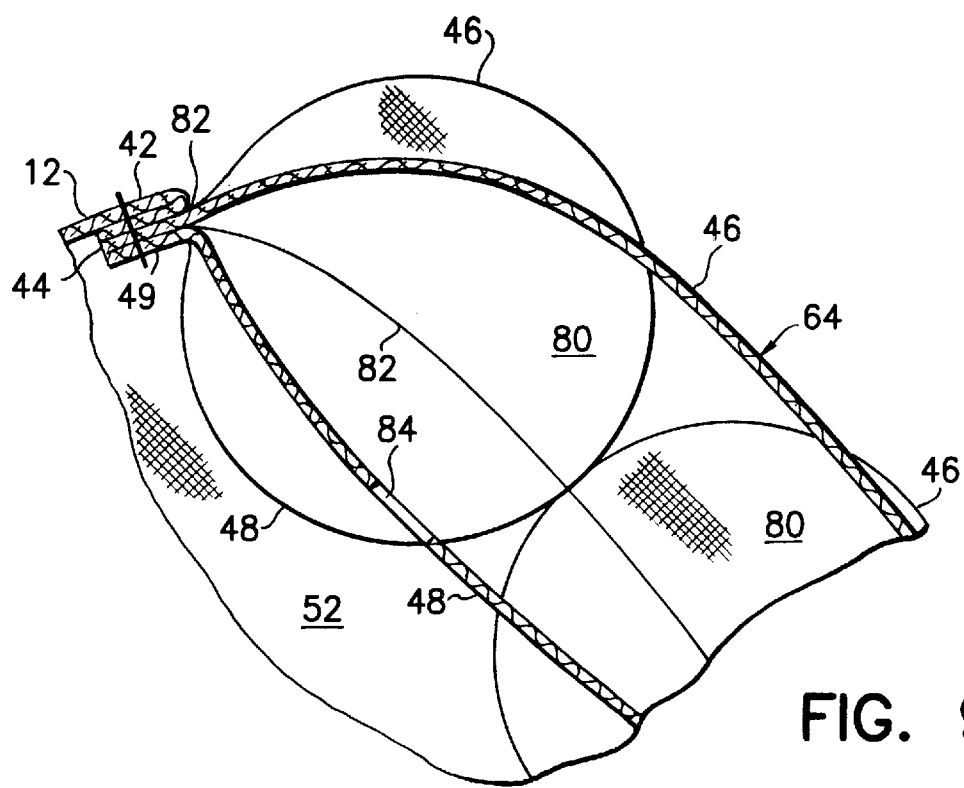
FIG. 9 is an enlarged fragmentary sectional view taken on the line 9—9 of FIG. 3.

As shown in FIGS. 1 and 3, the first fabric panel portion 12 extends outwardly from the backing plate 22 at the top and bottom of the cushion. At its first 42 and second 43 ends it is stitched to opposite ends 44, 46 of an outer panel portion 46 (FIG. 8). It should be understood that the first panel portion 12 and the outer panel portion 46 could be a single unitary panel extending all around the outside of the cushion An inner fabric panel 48 is generally rectangular, has first and second outer ends 49, 51 (FIGS. 1, 8) and is also stitched respectively to the ends 44, 45 of the outer panel portion 46 (FIGS. 1 and 3). Side panels 50 and 52 are stitched about their peripheries 54, 56 to the respective side margins 58, 59 (FIGS. 1 and 3) of the outer panel portion 46, the side margins 60, 61 of inner panel 48 and the side margins 62, 63 of the first panel portion 12 (FIGS. 1 and 3) The inner panel 48 and outer panel portion 46 thus comprise a cushion-shaping enclosure 64.

The inner panel 48 is formed with a central opening 66, and the outer end 68 of the deployment tube 32 is secured thereabout. The deployment tube 32 thus will, upon activation of the airbag inflator 26 communicate inflation gasses from the inflator 26 into the cushion-shaping enclosure 64.

The side panels 50, 52 and the first panel portion 12 form a boundary wall 70. The boundary wall 70 with inner panel 48 defines an aspirated-air chamber 72 surrounding the deployment tube 32.

To give the cushion-shaping enclosure 64, when filled, greater stability and definition, the inner fabric panel 48 and the outer panel portion 46 are held contiguous in localized areas by a plurality of spaced parallel lines of stitching 74 which extend inward from the side margins 58, 59 and 60, 61 but are interrupted in a central zone 76 of the cushion-shaping enclosure 64.

When inflated, the cushion-shaping enclosure 64 thus comprises a wide central longitudinal rib 78 in zone 76 and a plurality of cylindrically-shaped lateral fluid-filled pockets 80 immediately adjacent each other (FIG. 1). The periphery 82 of the enclosure 64 is thus spaced laterally well out from the outer end of the deployment tube 32 when the cushion is inflated. The periphery 82 is also spaced from the backing plate 22.

The inner fabric panel 48 of the cushion-shaping enclosure 64 is formed with vent means comprising at least one, and preferably two ports 84, leading into the aspirated-air chamber 72. The vent ports 84 are spaced from the opening 66 at the outer end 68 of the deployment tube 32 and permits flow of inflation gas from inside the cushion-shaping enclosure 64 to the aspirated-air chamber 72.

The operation of the airbag cushion 11 and mounting 10 embodying the invention will now be described. Normally the cushion is folded within its canister (not shown) in the dashboard, forward of the passenger seat in a vehicle. Upon impact, sensors (not shown) energize a resistive element within an ignitor or squib (not shown) in the inflator 26. The inflator then activates, blowing inflation gasses through gas exhaust ports 27. These inflation gasses are deflected, by a baffle part 31 of the retaining ring 30, in an outward direction into the deployment tube 32 to fill its full length (FIG. 1) and then through the opening at the outer end 68 of the tube 32 to fill the cushion-shaping enclosure 64. As pressure builds, the deployment tube 32 erects to its full length and the cushion-shaping enclosure 64 stiffens laterally. Thus, the cushion-shaping enclosure 64 fills with inflation gasses flowing through the central wide rib 78 and into the pockets 80 so that the condition is generally as shown in FIG. 1.

During this process the periphery 82 of the cushion-shaping enclosure 64 pulls the boundary wall 70 of the aspirated-air chamber 72 outward from the backing plate 22. This creates a vacuum in the aspirated-air chamber 72. The vacuum demands to be filled and aspirates air inward from the ambient through the openings 34 in the backing plate 22, flexing the flapper valves 36 as shown in FIG. 6. The aspirated-air chamber 72 is thus filled with air at atmospheric pressure. The resilient flapper valves 36 then close (FIG. 2).

At this time the cushion-shaping enclosure 64 being filled with inflation gasses at high pressure vents excess inflation gasses through the ports 84 into the aspirated-air chamber 72 creating in that chamber a positive pressure. These pressurized inflation gasses do not escape because the flapper valves 36 have flapped shut against the backing plate 22.

The entire cushion structure (FIG. 1) is now filled with positive pressure and serves the designed airbag cushion purpose.

By using an aspirated-air chamber 72 filled by aspirating air from the ambient through the one-way flapper valves 36, it will be understood that the inflator 26 is not required to fill the entire cushion 11 from an empty state with inflation gasses. Instead, the cushion 11 is partially filled with atmospheric air in the aspirated-air chamber 72. This air is supplemented by flow of pressurized inflation gasses through the ports 84, but it is the drawing out from the backing plate 22 of the side panels 50, 52 and the first panel portion 12 constituting boundary wall 70 which make possible the initial filling of the aspirated-air chamber 72. Thus, a smaller inflator can be used on the passenger side. It can be a driver's side inflator or a reduced-output passenger inflator.

Because the system is less aggressive than conventional inflation of airbags, and also because the inflator is smaller and of less capacity, there is improved hardware integrity and/or potential to reduce the strength of hardware. Because the inflation action is less forceful, there is also a significant reduction in out-of-position injuries.

Variations in the invention are possible. Thus, while the invention has been shown in only one embodiment, it is not so limited but is of a scope defined by the following claim language which may be broadened by an extension of the right to exclude others from making, using or selling the invention as is appropriate under the doctrine of equivalents.

We claim:

1. An airbag cushion comprising:
   a. a deployment tube having an inner end and an outer end,
   b. a cushion-shaping enclosure connected to the outer end of the deployment tube and having a periphery, and
   c. a boundary wall adapted to define an aspirated-air air chamber surrounding the deployment tube and having an outer end connected to the periphery of the cushion-shaping enclosure and an inner end surrounding the inner end of the deployment tube, wherein the cushion-shaping enclosure comprises an outer panel portion and an inner panel portion, the portions being coextensive and both having peripheries and the peripheries being joined together and wherein the boundary wall comprises a first panel portion having a central opening comprising the inner end of the boundary wall and having opposite ends, the opposite ends being joined to opposite ends of the cushion-shaping enclosure.

2. An airbag cushion as claimed in claim 1 wherein at least one vent is disposed between the aspirated-air chamber and the cushion-shaping enclosure.

3. An airbag cushion as claimed in claim 2 wherein the inner end of the deployment tube and the inner end of the boundary wall are both adapted to be secured to a backing plate.

4. An airbag cushion as claimed in claim 1 wherein the boundary wall also comprises side panels having peripheries, the peripheries of the side panels being secured to opposite sides of the first panel portion and outer panel portion.

5. An airbag cushion as claimed in claim 1 wherein the outer panel portion and inner panel portion comprising the cushion-shaping enclosure are held contiguous in localized areas by a plurality of spaced parallel lines of stitching disposed transversely of the cushion-shaping enclosure and are discontinuous in a central zone of the cushion-shaping enclosure so that when inflated, the cushion-shaping enclosure is partly defined by a plurality of fluid-filled pockets.

6. An airbag cushion assembly comprising:
   a cushion as defined in claim 1, and
   b. mounting means comprising:
   (1) a backing plate centrally securing an airbag inflator, the inner end of the deployment tube being secured to the backing plate about the inflator, the backing plate being formed with aspirated-air openings on either side of the inflator, the openings being adapted to pass a volume of aspirated air,
   (2) a flapper centrally secured to the backing plate and adapted to normally overlie and close the aspirated-air openings but to permit flow of aspirated air into the aspirated-air chamber, and
   (3) a retaining frame secured to the backing plate surrounding the inflator and the aspirated-air openings and clamping the inner end of the boundary wall between the frame and the backing plate.

7. An airbag cushion comprising:
   a. a central deployment tube having an inner end and an outer end, the inner and adapted to be connected to mounting means,
   b. first panel portion having opposite sidle margins and opposite ends and a central opening,
   c. an outer panel portion having opposite side margins and opposite ends secured to the opposite ends of the first panel, respectively,
   d. an inner panel having a perimeter and secured at its perimeter to the opposite side margins and opposite ends of the outer panel, the inner panel having an opening connected about the outer end of the deployment tube to thereby define with the outer panel a cushion-shaping enclosure,
   e. side panels secured to the side margins of both the first panel portion and the outer panel portion and defining with the first panel portion a boundary wall a the central opening in the first panel portion defining the inner end of the boundary wall and adapted to be attached to the mounting means at a location laterally outward from the inner end of the deployment tube, the boundary wall and the inner panel defining an aspirated-air chamber surrounding the deployment tube,
   f. the inner panel being formed with at least one vent from the cushion-shaping enclosure into the aspirated-air chamber at a location remote from the outer end of the deployment tube.

8. An airbag cushion as claimed in claim 7 wherein the outer panel portion and inner panel comprising the cushion-shaping enclosure are held contiguous in localized areas by a plurality of spaced parallel lines of stitching disposed transversely of the cushion-shaping enclosure, the lines being discontinuous in a central zone of the cushion-shaping enclosure so that when inflated, the cushion-shaping enclosure is partly defined by a plurality of fluid-filled pockets.

9. An airbag cushion as claimed in claim 7 wherein the central opening in the first fabric panel is rectangular and is larger than the inner end of the deployment tube.

10. A airbag assembly comprising:
    a. the airbag cushion as claimed in claim 7,
    b. a mounting means connected to the inner end of both the deployment tube and the inner and of the boundary wall, the mounting means including one-way valve means connected to the aspirated-air chamber and permitting inflow of ambient air into the aspirated-air chamber and blocking outflow, and
    c. an airbag inflator mounted in the mounting means and connected to the inner end of the deployment tube.

11. An airbag assembly as claimed in claim 10 wherein the mounting means comprises a backing plate centrally mounting the airbag inflator and formed with aspirated-air openings on either side of the airbag inflator, the plate having flapper valves extending outward from the airbag inflator and covering the aspirated-air openings and engaging the backing plate and being flexible to constitute the one-way valve means.

12. An airbag cushion and mounting assembly comprising:
    a. a deployment tube having an inner end and an outer end,
    b. a cushion-shaping enclosure connected to the outer end of the deployment tube and having a periphery
    c. a boundary wall defining an aspirated-air chamber surrounding the deployment tube and having an outer end connected to the periphery of the cushion-shaping enclosure and an inner end,
    d vent means between the cushion-shaping enclosure and the aspirated-air chamber, and
    e. mounting means securing an airbag inflator and connecting the inner end of the deployment tube about the airbag inflator, said mounting means having a one-way valve, the inner end of the boundary wall connected to the mounting means around the one-way valve, the valve permitting ambient air into the aspirated-air chamber but blocking escapee, and
    wherein the boundary wall comprises a first panel portion having a central opening comprising the inner end of the boundary wall and having side margins and opposite ends, the opposite ends of the first panel portion being secured to the cushion-shaping enclosure.

13. An airbag cushion and mounting assembly as claimed in claim 12 wherein the mounting means includes a backing plate having at least one aspirated-air opening and said one-way valve comprises a resilient flap mounted on the backing plate normally in closed position over the aspirated-air opening and adapted to flex to permit flow of ambient air into the aspirated-air chamber.

14. An airbag cushion and mounting assembly as claimed in claim 12 wherein the mounting means is formed with an aspirated-air openings on opposite sides of the airbag inflator and the one-way valve comprises a resilient flapper normally closing each opening.

15. An airbag cushion and mounting assembly as claimed in claim 13 wherein the resilient flap is of thermoplastic polyester alloy.

16. An airbag cushion and mounting assembly as claimed in claim 12 wherein the central opening is rectangular and the mounting means comprises a rectangular backing plate and the rectangular backing plate is secured around the central opening.

17. An airbag cushion and mounting assembly as claimed in claim 12 wherein the boundary wall also comprises side panels having peripheral margins the peripheral margins of the boundary wall being secured to the side margins of the first panel and the periphery of the cushion-shaping enclosure on respective opposite sides thereof.

18. An airbag cushion and mounting assembly comprising:
    a. a deployment tube having an inner end and an outer end, b. a cushion-shaping enclosure connected to the outer end of the deployment tube and having a periphery,
c. a boundary wall defining an aspirated-air chamber surrounding the deployment tube and having an outer end connected to the periphery of the cushion-shaping enclosure and an inner end,
d. vent means in the cushion-shaping enclosure into the aspirated-air chamber, and
e. mounting means securing an airbag inflator and connecting the inner end of the deployment tube about the airbag inflator, said mounting means having a one-way valve, the inner end of the boundary wall connected to the mounting means around the one-way valve, the valve permitting ambient air into the aspirated-air chamber but blocking escape, and wherein the cushion-shaping enclosure comprises an outer panel portion and an inner panel portion, the outer and inner panel portions being peripherally joined and held contiguous in localized areas by a plurality of spaced parallel lines of stitching disposed transversely of the cushion-shaping enclosure, each of said parallel lines being discontinuous in a central zone of the cushion-shaping enclosure so that when inflated, the cushion-shaping enclosure is partly defined by a plurality of fluid-filled pockets.

19. An airbag cushion and mounting assembly as claimed in claim 18 wherein the vent means are ports in the inner panel.

* * * * *